(12) United States Patent
Sousa Fadigas et al.

(10) Patent No.: US 8,841,497 B2
(45) Date of Patent: Sep. 23, 2014

(54) PREPARATION OF HETEROGENEOUS CATALYSTS USED IN SELECTIVE HYDROGENATION OF GLYCERIN TO PROPENE, AND A PROCESS FOR THE SELECTIVE HYDROGENATION OF GLYCERIN TO PROPENE

(75) Inventors: José Carlos Sousa Fadigas, São Paulo (BR); Rossano Gambetta, Santo André (BR); Cláudio José de Araújo Mota, Rio de Janeiro (BR); Valter Luiz da Conceição Gonçalves, Rio de Janeiro (BR)

(73) Assignees: Quattor Petroquimica S.A., Sao Paulo (BR); Universidade Federal do Rio de Janeiro—UFRJ, Rio de Janeiro (BR)

( * ) Notice: Subject to any disclaimer, the term of this patent is extended or adjusted under 35 U.S.C. 154(b) by 579 days.

(21) Appl. No.: 13/001,270

(22) PCT Filed: Jun. 24, 2009

(86) PCT No.: PCT/BR2009/000178
§ 371 (c)(1),
(2), (4) Date: Mar. 31, 2011

(87) PCT Pub. No.: WO2009/155674
PCT Pub. Date: Dec. 30, 2009

(65) Prior Publication Data
US 2011/0184216 A1    Jul. 28, 2011

(30) Foreign Application Priority Data
Jun. 24, 2008    (EP) ...................................... 0806337

(51) Int. Cl.
*C07C 1/20*    (2006.01)
*C07C 31/22*    (2006.01)
*B01J 23/00*    (2006.01)
*B01J 23/70*    (2006.01)
*B01J 23/745*    (2006.01)
*B01J 37/02*    (2006.01)
*B01J 23/883*    (2006.01)
*B01J 37/04*    (2006.01)
*B01J 37/08*    (2006.01)
*B01J 35/00*    (2006.01)
*B01J 37/03*    (2006.01)
*B01J 23/881*    (2006.01)
*B01J 21/18*    (2006.01)
*B01J 37/34*    (2006.01)

(52) U.S. Cl.
CPC .............. *B01J 21/18* (2013.01); *B01J 37/0236* (2013.01); *B01J 23/883* (2013.01); *B01J 37/04* (2013.01); *B01J 37/082* (2013.01); *B01J 35/0006* (2013.01); *B01J 37/031* (2013.01); *B01J 37/0201* (2013.01); *B01J 23/881* (2013.01)
USPC ........... 585/250; 585/639; 502/300; 502/305; 502/325; 502/313; 502/263; 502/355; 502/84; 502/87

(58) Field of Classification Search
USPC ................................................. 585/250, 639
See application file for complete search history.

(56) References Cited

U.S. PATENT DOCUMENTS

5,389,241 A * 2/1995 Sudhakar et al. ......... 208/254 H
5,500,401 A   3/1996 Sudhakar et al.
(Continued)

FOREIGN PATENT DOCUMENTS

DE   16 68 219 A1   3/1972
DE   42 38 492 A1   5/1994
(Continued)

OTHER PUBLICATIONS

Kazuhisa, Murata, et al.; "Propane formation by aqueous-phase reforming of glycerol over Pt/H-ZSM5 catalysts"; Reaction Kinetics and Catalysis Letters, Springer Science and Business Media; Dordrecht, NL; vol. 93; No. 1; Mar. 1, 2008; pp. 59-66; XP019580203ISSN: 1588-2837.

(Continued)

*Primary Examiner* — In Suk Bullock
*Assistant Examiner* — Youngsul Jeong
(74) *Attorney, Agent, or Firm* — Alston & Bird LLP (57) ABSTRACT

The present invention relates to a process of formulating and preparing supported multi-metal catalysts based on metal oxides and inorganic salts of metals. The impregnation technique is employed by two methods: the slurry method and the modified-pH variation method, which are used in two steps for obtaining the catalyst. The present invention also relates to a process called Glycerol to Propene (GTP) process, corresponding to the transformation of glycerol or glycerin to propene. The reaction involved in the process of the present invention is the selective hydrogenation of glycerin, which takes place by contact of the charge of glycerin carried by hydrogen in a continuous stream system on the catalytic bed containing multi-metal catalysts, specifically prepared for this purpose.

5 Claims, 5 Drawing Sheets

(56) References Cited

U.S. PATENT DOCUMENTS 6,040,259 A * 3/2000 Mohr et al. .................... 502/67
2009/0054701 A1 * 2/2009 Abhari .......................... 568/861

FOREIGN PATENT DOCUMENTS

| DE | 43 02 464 | A1 | 8/1994 |
| EP | 0 713 849 | A1 | 5/1996 |
| EP | 1 537 912 | A1 | 6/2005 |

OTHER PUBLICATIONS

Search Report and Written Opinion for International Application No. PCT/BR2009/000178, dated Dec. 16, 2009; 14 pages.

Preliminary Report on Patentability for International Application No. PCT/BR2009/000178, dated Nov. 2, 2010; 21 pages.

* cited by examiner

PREPARATION OF HETEROGENEOUS CATALYSTS USED IN SELECTIVE HYDROGENATION OF GLYCERIN TO PROPENE, AND A PROCESS FOR THE SELECTIVE HYDROGENATION OF GLYCERIN TO PROPENE

FIELD OF THE INVENTION

The present invention refers to a process for the preparation of multi-metallic heterogeneous catalysts, more specifically transition-metal based catalysts prepared by employing two steps of impregnating a support for use in the transformation of glycerin to propene. The present invention also relates to a process of selective hydrogenation of glycerin to propene, catalyzed by said catalysts.

BACKGROUND OF THE INVENTION

The present world economic growth points the considerable increase in demand for polyolefins, thus requiring an increase in the production of basic petrochemical products, chiefly ethene and propene.

The propene market is commanded by the strong demand for polypropylene, obtained through polymerization of propene gas (which is the monomer), using specific metallic catalysts. Ever since the introduction of polypropylene, it has become one of the most important thermoplastic resins, still being today the resin which sales grow the most in the world. At present, polypropylene is the third most sold thermoplastic in the world, representing physical sales of about US$17 million t/y with a value higher than US$11 billion/year.

In Brazil, Asia, Europe and Latin America, the predominant raw material for producing propene is naphtha. Over the last few years, refineries have increased much the volume of processed petroleum, and the naphtha market, for example, has been representing a crowing demand.

In this scenario, the need arises for considerably increasing the perspectives of investments in petrochemical plants, in technologies used by refineries and mainly in alternative sources of raw materials.

At present, the two traditional processes of producing ethane and propene are steam cracking and fluid catalytic cracking (FCC). Steam cracking of hydrocarbons is the main way of producing light olefins, especially ethane. The feed charges for the steam cracking units are mainly petrochemical naphtha, gasoils and condensates. On the other hand, with regard to FCC (fluid catalytic cracking), one can say that this is a process widespread in the world, due mainly to two factors. The first one is the fact of effectively contributing with the refinery to adjust the production thereof to the real needs of the local consumer market, in view of its great operational flexibility. The second factor that has made this a well-established process is related to the economic aspect, because FCC transforms residual fractions of low commercial value into noble derivatives of high value such as gasoline, liquefied petroleum gas (LPG) and basic petrochemicals like ethene and propene. The process consists in breaking heavy molecules present in gasoil and residues by the action of an amino-silicate based catalyst under high temperatures. The rupture of the bonds enables the production of light molecules, mainly compounds having from 3 to 12 carbon atoms (propene, LPG and gasoline), due to the selectivity of the catalyst used.

One of the emerging technologies for the production of olefins comprises Petrochemical FCC processes. They are substitutes for the conventional FCC process, but with much higher reaction temperature and catalyst circulation. This couple of values, which configures a high and severe condition, leads to the cracking of heavy and middleweight fractions, producing light compounds in the range of liquefied petroleum gas (LPG) and fuel gas. This, associated with the use of low pressure and adequate catalysts, maximizes the yield of light olefins. The operational conditions of Petrochemical FFC are much more severe than those of a conventional FFC process. As from a reaction temperature of 550° C. there is a substantial increase in the production of gas and LPG due to the cracking of gasoline. At approximately 600° C., the cracking of the LPG formed also takes place, and there is an exponential increase in the production of ethene. Therefore, the maximization of propene production requires reaction temperatures between 560° C. and 590° C., whereas the maximization of ethene requires even higher reaction temperatures, higher than 600° C.

Another emerging technology, still little employed, is the so called Methanol-to-Olefins (MTO) process, which is a technology of converting natural gas to olefins, known as Gas-to-Olefins (GTO) and which is based on a process of converting methanol to olefins, mainly ethene and propene, but butene as well. Natural gas is chiefly converted into methanol through the production of synthesis gas and subsequent reaction on suitable catalysts. The natural gas is firstly converted into methanol through the production of synthesis gas and further reaction onto appropriate catalysts. In the MTO process methanol is converted in a controlled way, under the action of a porous synthetic molecular sieve composed by silicon, aluminum and phosphorus oxides. These materials are combined with other components of the catalyst for selectively converting methanol to light olefins. Thus, the GTO process is a combination of the production of synthesis gas, production of methanol and conversion of methanol into olefins. The MTO process exhibits a global efficiency of 80%, based on the methanol used and enables a production of ethene and propene in ratios raging from 0.75:1 to 1.5:1 depending on the reactor conditions. The methanol production from synthesis gas is exothermic and favored under high pressures. The standard operation condition (for synthesis under low pressure) is 50 to 80 bar and temperatures ranging from 210 to 290° C. (input/output reactor). For up to 7% by mol of methanol at the reactor output, from 3.5 to 7% are recycled to the composition to achieve 90% to 97% of carbon monoxide conversion, which depends on the quality and composition of the gas, as well as on the recyclate ratio. The three main suppliers of the MTO process are UOP/Hydro, Lurgi and Exxon Mobil, with some variations among them. For instance, the Lurgi process produces only one olefin from methanol, namely propene, thus being called methanol-to-propylene (MTP).

Although the Methanol-to-olefin process is well known, is not yet employed on a large scale. Besides, the chemical reactions that take place are still not well understood and are the object of studies until today. At present, there are two demonstration plants for the MTO process in Norway, owned by Lurgi/Statoil and UOP Hydro. Although the MTO reactions are quite selective, by-products C4+ (butenes) are certainly also produced.

Another emerging technology for the production of propene is called "methatesis". Olefin methatesis was observed for the first time in 1956 by the Petrochemistry Department of DuPont. The passage of propene through a molybdenum-aluminum catalyst provided a mixture of gases composed by ethylene and 1-butene. A similar result was achieved by researchers of Standard Oil Co., in 1960. In 1964, researchers of Phillips Petroleum Company were seeking the production of high-octane-number gasoline. Their intention was to produce iso-octane through the reaction between iso-butane and 2-butene, catalyzed by hexacarbonylmolybdenum supported on alumina. However, that reaction provided 2-pentene and propene, and said reaction was named "olefin deproportionation. In 1967, after a systematic study with unsaturated compounds researchers of Goodyear tire and Rubber Company suggested the name olefin methatesis for the newly discovered reaction. In the chemical sense, the word "methatesis" describes, by translation from the Greek language, "change of position", that is to say, the change of covalent bonds between two alkenes (or olefins) or between an alkene and an alkyne. In the olefin chemistry, "methatesis" refers to a redistribution of the carbon backbone, on which carbon-carbon double bonds are rearranged in the presence of a metal-carbon complex, representing a catalytic method of breaking and forming multiple carbon-carbon bonds. This reaction is known in petrochemistry and in polymer chemistry since over 40 years ago, but only in the Nineties, with the advent of new and efficient catalysts developed mainly by the research groups of Schrock and Grubbs, it emerged as a powerful tool in the academic organic chemistry.

Finally, the technology referring to the Methanol-to-propylene (MTP) method, already cited before, corresponds to the transformation of methanol into propene (MTP). The Lurgi technology of transforming methanol to propene (MTP) is based on the efficient combination of two main characteristics:

1—fixed-bed reactor system, selected as the most suitable from the technological and economical point of view;
2—high selectivity and stability of the catalyst based on commercially manufactured zeolite.

Methanol is catalytically converted into hydrocarbons, predominantly propene, and there is no production of ethene. Gasoline, LPG, fuel gas and water are by-products. At the MTP plant methanol is firstly converted to dimethylether (DME) and water, in a pre-reactor. By using a highly active and selective catalyst the thermodynamic balance is achieved, which results in a methanol/water/DME mixture under appropriate operational conditions. The conversion of methanol to DME exceeds 99%, with propene being the essential compound. Additional reaction procedures in the downstream reactor, in similar reaction conditions, provide maximum yield of propene. The product mixture that leaves the reaction system is at a low temperature. This consists of gaseous product, organic liquid and water, which need to be separated.

After compression of the gaseous product, traces of water, $CO_2$ and DME are removed and the gas is processed with typical purity of over 97%. Various olefins are recycled to increase the yield of propene. In order to avoid the accumulation of inert materials in the recycle, a minor purge is required for light olefins and for C4/C5 cuts. Additional water resulting from the conversions of methanol is also removed. This water may be processed into drinking water.

The use of any of the raw materials mentioned so far to obtain propene will require new units to be designed (or the present ones to be adapted) for processing same. However, one can notice the need for investments in alternative sources of raw materials and for implantation of emerging technologies, so as to aggregate value to the petrochemical industry, thus meeting the demand for ethene and propene.

An alternative source for obtaining propene can originate from the main co-product of the production of biodiesel: glycerin. Biodiesel is composed of methyl or ethyl esters of fatty acids, and used in mixture with petrodiesel. Compared with diesel oil derived from petroleum, biodiesel can reduce up to 78% of carbon dioxide emissions, considering re-absorption by plants. Besides, it reduces by 90% the emissions of smoke and virtually eliminates sulfur oxide emissions. In general, this product is obtained from transesterification of plant oils with alcohols such as methanol and ethanol, using basic or acidic catalysis, or even by esterification of fatty acids in the presence of acidic catalysts.

From the chemical point of view, the production of biodiesel from plant oils involves a transesterification reaction. The plant oil is a triglyceride, that is, it is a tri-ester derived from glycerin or glycerol. Under the action of a basic or even acidic catalyst, and in the presence of methanol or ethanol, the oil undergoes a transesterification, forming three molecules of methyl or ethyl esters of fatty acids that compose plant oil, and releasing glycerin or glycerol, according to the scheme I:

Scheme I: transesterification of plant oils for the production of biodisel.

plant oil biodiesel glycerin

For each 90 m³ of biodiesel produced by transesterification of plant oils, approximately 10 m³ of glycerin are formed. This scenario indicates that the commercial feasibility of biodiesel passes through the consumption of this extra glycerin volume, seeking large-scale applications, aggregating value to the production chain. Today, the main application of glycerin is in the cosmetic, soap and pharmaceutical industries, sectors that are incapable of absorbing, alone, the volume of glycerin generated with the production of biodiesel.

Thus, the risk of glycerin becoming an environmental problem, since there is no adequate demand for a growing volume of production of this product, can be considerably reduced. Besides, the fact that glycerin becomes a residue without commercial value checkmates the social-economical-environmental feasibility of biodiesel, at a time when the demand for it is increasing day by day due to the perception that biodisel is a cleaner source of energy, which generates social benefits as well.

Glycerol or glycerin is a triol with three carbon atoms. It has high viscosity and boiling point, being miscible with polar substances like water and immiscible with hydrocarbons and other non-polar compounds.

The hydrogenation of glycerin is described in the literature and leads to the obtainment of various substances, such as propyleneglycol, 1,2-propanodiol and 1,3-propanodiol, acetol, etc. However, the prior art does not present any process or reaction using homogeneous or heterogeneous catalysts in the presence of molecular hydrogen ($H_2$) and that could make the production of propylene feasible.

The scientific literature reports a few examples of hydrogenation and hydrogenolysis of glycerin using various homogeneous and heterogeneous catalysts.

Runberg et al, Appl. Catal. 17, (1985) 309; Wojcik and Adkins, J. Am. Chem. Soc. 55, (1933) 1294; Wang et al. Ind. Eng. Chem. Res. 34, (1995) 3766-3770 and Lahr and Shanks, Ind. Eng. Chem. Res. 42, (2003) 5467-5472, describe, in recent studies, that conventional catalysts for hydrogenation of alcohols, such as nickel, ruthenium and palladium, are not effective for hydrogenation of glycerin. On the other hand, copper-based catalysts exhibit good results in hydrogenation of alcohols in general. These catalysts exhibit good selectivity for cleavage of the C—O bond and low affinity for C—C bonds. It should be pointed out that all these studies involve discontinuous reactor conditions.

Chaminand et al. Green Chem., 6, (2004) 359-361 describe the hydrogenation of an aqueous glycerin solution at 180° C. under an atmosphere of 80 bar of $H_2$ and in the presence of Cu, Pd or Ru catalysts supported on ZnO, activated coal (C) or $Al_2O_3$. The reactions produce 1,2-propanodiol (1,2-PDO) and 1,3-propanodiol (1,3-PDO) with good selectivity. Another important detail is the influence of the solvent (water, sulfonane, dioxane). The selectivity of 1,2-PDO increased significantly in the presence of the CuO/ZnO combination using water as a solvent. For a good selectivity to 1,3-PDO, the studies with Rh/C catalysts and sulfolane as a solvent presented good results. The addition of an additive ($H_2W0_4$) has helped in improving the selectivity.

Dasari et al. Appl. Catal. A: Gen. 281, (2005), 225-231 describe the hydrogenation of glycerin into propylene glycol using nickel, palladium, platinum, copper and copper/chromium catalysts. At temperatures higher than 200° C. and under pressures of hydrogen of 200 psi, the propylene glycol selectivity decreases due to the excessive hydrogenolysis.

Xie end Schlaf, J. Mol. Catal. A: Chem. 229, (2005) 151-158 demonstrated that the hydrogenolysis of glycerin to 1,2-propanodiol and 1,3-propanodiol, using [cis-Ru(6,6-$Cl_2$-biby)$_2$($OH_2$)$_2$]($CF_3SO_3$)$_2$ as the catalyst in continuous stream of $H_2$ under room pressure, besides being ecologically and economically feasible, does not generate the by-products derived from the polymerization and decomposition of triol, in drastic reaction conditions.

Hirai et al Energy & Fuels. 19, (2005) 1761-1762, describe a study in which ruthenium is dispersed in different carriers, such as: $Y_2O_3$, $ZrO_2$, $GeO_2$, $La_2O_3$, $SiO_2$, MgO and $Al_2O_3$. These catalysts transformed glycerol into $H_2$, $CH_4$, CO and $CO_2$. The catalyst that exhibited the best performance was Ru/$Y_2O_3$. The catalyst is pre-treated at 600° C. under a stream of $H_2$ for 1 h. After this procedure, a stream of argon is used as carrier gas. With the aid of an injecting pump, an aqueous glycerin solution is slowly dropped onto the catalyst surface, which is at a temperature of 500° C. The generated gases are carried and analyzed in a gas chromatograph. With the 100% conversion to glycerin, the selectivity of the products varies between 60 and 80% for $CO_2$ and between 80 and 90% for $H_2$.

Chiu et al. Ind. Eng. Chem. Res. 45. (2006) 791-795 published a study according to which, after the transesterification process, calcium hydroxide in combination with phosphoric acid generates a precipitate characterized as hydroxyl-apatite, at different measurements of pH. Thus, raw glycerin can be used directly in the hydrogenolysis reaction for generating propylene glycol, without the yield being affected.

Recently, Miyazawa et al. Appl Catal. A: Gen. 318, (2007) 244-251, described the hydrogenation of glycerin to produce propylene glycol. The use of mild reaction conditions is still a great challenge for researchers, mainly at the hydrogenation step wherein usually lower temperatures work against the process. The Ru/C catalyst in combination with Amberlyst (ionexchange resin supplied by Rohm and Haas) exhibited good results. This catalyst was prepared from Ru(NO)($NO_3$)$_3$ and activated charcoal, followed by a programmed-temperature procedure, under continuous air stream, which enabled a large surface area, which in combination with the acidity of Amberlyst, makes the reaction process much more efficient.

Maris and Davis, J. Catl. 249 (2007) 328-337 described the hydrogenation of glycerin on Ruthenium and Platinum catalysts supported on coal. The reaction was carried out with an aqueous glycerin solution at a temperature of 100° C. and under a pressure of 40 bar of hydrogen, leading to the production of ethylene glycol and propylene glycol.

The prior art also contemplates some patent documents relating to the glycerin hydrogenation and hydrogenolysis process.

The Chinese document CN 101085719 of Jun. 29, 2007, filed by Shanhai Huayi Acrylic Acid Co., describes a glycerin hydrogenation process in the temperature range of 180-300° C. and pressure from 1.0-10.0 MPa. The glycerin/$H_2$ molar ratio is of 1:30 an the space velocity used was of 1.0-5.0 $h^{-1}$ in the presence of Cu, Co and Al metallic oxides with percentage of 25% by weight of metal.

The Chinese document CN 101054339 of May 31, 2007, filed by Shanghai Huayi Acrilic Acid Co., describes another glycerin hydrogenation method using a mixture of gases and hydrogen in the presence of supported catalysts. The active component contains one or more metals, such as Ni, Co, Mn, Cu, Cr, Ca, Zn, Fe, Sn, W, Mo, V, Ti, Zr, Nb, La, Re, Ru, Rh, Pd and Pt. The temperature used ranges from 120 to 450° C., and the pressure ranges from 0.2 to 30.0 Mpa. The space velocity employed ranges from 0.1 to 50.0 $h^{-1}$, and the glycerin/$H_2$ molar ratio was of 1:(1-50). The support used comprises one or more of the following materials: zeolites, $Al_2O_3$, $SiO_2$, MgO, $TiO_2$, $ZrO_2$, and amorphous aluminosilicates. The resulting products contain from 3 to 100% by weight n-propanol and one or more from methane, methanol, ethanol, ethylene glycol, 1,2-propanodiaol, 1,3-propanodiol, acetone and glycerin.

Chinese document CN101012149 of Feb. 7, 2007, filed by Univ. Nanjing, refers to a method of preparing 1,2-propanodiol under mild conditions, which comprises: using copper, zinc and manganese and/or aluminum as the catalyst; aerate glycerin and hydrogen continuously from the reactor top; hydrogenating glycerin at 200-250° C. under pressure of 2.5-5 MPa; extracting and collecting the reaction product from the catalyst bottom in a continuous manner; separating the gas; returning the gas to the recycle; and adjusting the weight rate of the metallic element of the catalyst.

Japanese document JP 2008044874 of Aug. 14, 2006, filed by Nat. Inst. Of Adv. Ind. & Technol., and Sakamoto Yakuhin Koogyo Co., Ltd., relates to a method of producing propanodiols, particularly 1,3-propanodiol, with a high yield by the glycerin hydrocracking method. Said method comprises hydrogenating glycerin in the presence of an acid and a hydrogenation catalyst, wherein a solvent may be also present in the reaction system, if circumstances so require. The acid is a solid at room temperature and the total weight ratio of the acid and of the hydrogenation catalyst to the total volume of glycerin and the solvent is of ⅕ to 10 g/mL.

Japanese document JP 416623,2 of Oct. 29, 1990, filed by Simitomo Metal Mining Co., refers to the obtainment of a catalyst for hydrogenation with high activity by depositing metals of the group VI (preferably Mo and/or W) and of the group VIII (preferably Co and/or Ni) on a catalytic support, with conversion of 99.4% and selectivity of 84.4 and 6%, respectively.

European document EP 0713849 of Nov. 17, 1995, filed by BASF AG, describes another glycerin hydrogenation process for the production of isopropanol, n-propanol and propanodiols, using metallic catalysts containing supported cobalt, copper, manganese or molybdenum and an inorganic polyacid. The yield obtained was 95%, the pressure was 3625 psi and the temperature of 250° C.

European document EP0598228 of Oct. 18, 1993, filed by Degussa A G, discloses a process of simultaneously producing propylene glycol and 1,3-propanodiol (1,3-PDO) by hydrogenation and hydrogenolysis of glycerin/water solutions containing 10-40-% by weight of glycerin at a temperature of 300° C.

German document DE 4302464 of Jan. 29, 1993, filed by Henkel KgaA, describes the process of glycerin hydrogenation to 1,2-propylene glycol in vapor phase with high conversion and selectivity. The temperature of the reaction ranges from 160 to 260° C., the pressure ranges from 10 to 30 bar and the glycerin/$H_2$ molar ratio is of 1:600.

Analyzing the above-cited prior art, it can be observed that most of the documents presented relate to glycerin hydrogenolysis. However, the final product of interest is not propene. Many of the documents analyzed have, as a product of interest, chiefly ethylene glycol, 1,2-propanodiol and 1,3-propanodiol. By virtue of this result, it is concluded that the catalysts used in those cases would not be capable of acting in a propene-selective manner due to the fact that the operational conditions are different, such as space velocity, glycerin/hydrogen molar ratio, reaction time, among others. Therefore, the technique of using catalysts prepared according to the present invention for obtaining propene in a selective manner is not an obvious result from the prior art to a person skilled in the art.

As mentioned before, there is a growing need to absorb the glycerin charge produced as a by-product of the preparation of biodiesel. Moreover, the strong demand for propene, which is the precursor of polypropylene, and the search for technologies that are cleaner and less aggressive to the environment are decisive factors that prove the need for new techniques.

OBJECTIVES OF THE INVENTION

It is an object of the present invention to provide the preparation of multimetallic catalysts based on metallic oxides and metallic inorganic salts, wherein at least one of them is a transition metal of the group VIII-B of the Periodic Table of Elements, by impregnation of the support, which occurs in two steps. The first one by the slurry method, and the second one by the pH-variation method. The resulting multi-metal catalyst exhibits a catalytic activity in the selective hydrogenation of glycerin, chiefly leading to the formation of propene or propane.

It is still another object of the present invention to provide a process of selectively hydrogenating glycerin to propene, using the catalysts obtained by the method described herein.

SUMMARY OF THE INVENTION

The present invention refers to a process of formulating and preparing multi-metal heterogeneous catalysts employing two steps of impregnating the support. The first step uses the slurry method, wherein a transition metal oxide preferably of the group VI-B of the Periodic Table is mixed with the support, forming a suspension and then a humid slurry. The second step is carried out by the method of varying the modified pH. In this case, an inorganic salt of metals preferably of the group VIII-B of the Periodic Table of elements is precipitated from an aqueous solution by varying the pH and added to the humid slurry previously formed, thus producing a second suspension which, after having been dried and calcined, leads to the formation of the multi-metal catalyst.

The present invention also refers to a process called Glycerol to propene (GTP), referring to the production of propene from the residual glycerol from the production of biodiesel, for using it, for instance, in the production of polypropylene, thus producing a product having properties equal to the original, but with the distinction of being obtained from a renewable source.

The reaction involved in the process according to the present invention is a glycerin selective hydrogenation which is carried out by the contact between the glycerin charge and hydrogen, in a continuous stream system, on the catalytic bed containing one of the multi-metal catalysts specifically prepared as described above.

DESCRIPTION OF THE FIGURES

The present invention will now be described with reference to the attached figures, wherein.

DETAILED DESCRIPTION OF THE INVENTION

The present invention is based on the fact that the process of formulating and preparing the proposed catalyst through the technique of impregnation by the slurry method and the modified pH variation method, enables the obtainment of supported catalysts with superior catalytic properties. Those catalysts can be used in hydrogenation reactions, and more specifically on selective hydrogenation of glycerin to propene.

In a more detailed manner, the process of the present invention leads to the production of supported catalysts based on double mixed metal oxides, forming a supported multi-metal catalyst.

Generally speaking, the process of preparing the catalyst according to the present invention comprises the following steps:

I. mixing, under stirring, a metal oxide in deionized water thus preparing suspension in the presence of a previously chosen support under controlled conditions of temperature, pH, concentration of metals present in said oxide and addition time, fixed according to the metals involved;

II. adjusting, in some cases, the pH of the suspension by the action of an acidic inorganic agent, added to the reaction medium in order to accelerate the impregnation step and improve the metallic dispersion. This is carried out especially when the suspension presents a pH value above 7.0;

III. after a period of time ranging from 30 minutes to 24 hours, decreasing the volume of the suspension by evaporation of the water under heating and reduced pressure, until a humid paste is obtained;

IV. then preparing an inorganic metal salt is prepared by dissolution of a soluble compound of the metal in deionized water; the latter is added dropwise of basic solution containing 30% ammonium hydroxide ($NH_4OH$) in water, thus allowing precipitation of the metal;

V. the resulting suspension is mixed, under stirring, with the humid paste obtained in the previous step under controlled conditions of temperature, pH, concentration of metals and addition time, fixed according to the metal involved;

VI. then adjusting the pH of the reaction medium by adding a basic inorganic agent, added to the reaction medium in order to accelerate the impregnation step and improve the metallic dispersion of the second metal in the catalyst formulation. The basic inorganic agent solution has a functional group that can be decomposed or volatilized after the step of mixing the metal salt solution and the humid paste, so as to change the pH of the new suspension and favor the impregnation and metallic dispersion of the second metal introduced in the preparation of the catalyst.

VII. after a period ranging from 30 minutes to 24 hours, decreasing the volume of the suspension by evaporation under reduced pressure and without heating, for a period ranging from 10 minutes to 24 hours, and then heating up to a minimum temperature of 70° C. and maximum temperature of 85° C., until the material is completely dried;

VIII. drying and calcining the resulting solid, according to a schedule of temperature fixed according to the metals present in the catalyst so as to obtain a double mixed metallic oxide impregnated on a support previously chosen in the formulation.

In order to obtain the desired materials, the suspension of the metal oxides is prepared in the presence of the support. In this first step, the thus obtained suspension is left under stirring for a period ranging from 30 minutes to 24 hours, preferably a period ranging from 30 minutes to two hours, so that the impregnation of the support will be completed. Then the suspension is subjected to a decrease in volume under reduced pressure and heating, until a slurry is formed.

Then, in a preferred embodiment, the second step begins, in which metallic inorganic salts that are precursors of other metallic oxides are used and which will be impregnated into the humid slurry of the previous step. For this, a solution of the chosen metallic inorganic salt is prepared, and the precipitation of the metal in the form of a complex is effected, by introducing drops of an ammonium hydroxide solution. This solution containing the precipitated metal is then mixed under stirring with the humid slurry of the first step, under controlled conditions of temperature, pH and time of addition of the solution on the humid slurry. It promotes the formation of a new suspension, wherein the final product of this step is a precursor suspension of the mixed metallic oxides impregnated onto the support.

In a preferred embodiment, after mixing the solution with the humid slurry, the pH of the reaction medium may need to be corrected by adding a basic agent, in order to favor the impregnation of the second metallic precursor. This being the case, volatile inorganic bases are useful such as those derived from the ammonium ion, but not limited to this example.

Also according to a preferred embodiment of the invention, the impregnation temperatures of both the first step and the second step may vary from 20° C. to 95° C., and the pH of the suspension may vary according to the impregnation step between values of 2-13.

Metal oxides in which the metal is in the oxidized form, such as molybdenum, chromium and tungsten oxides (metals of the group VI-B) are useful for the objectives of the present invention which is, however, not limited to these examples. Preferably the metal oxides are present at a concentration ranging from 0.1 to 50% by weight in the multi-metal catalyst.

Equally useful for the purposes of the present invention are precursors of metal oxides such as nitrates, chlorides, carbonates, phosphates, sulfates and oxalates of the chosen metals, but without limitation to these examples, comprising one of the metals of the group VIII-B, preferably iron or nickel. Preferably the metal oxide precursors are present in a concentration ranging from 0.1 to 50% by weight in the multi-metal catalyst.

Also useful for the present invention are supports with a high specific area, such as powdered activated charcoal, aluminosilicates, aluminas, clays, zeolites, molecular sieves, but without limitation to these examples.

The resulting catalyst must be dried at temperatures raging from 10° C. to 300° C., preferably from 40 to 150° C., followed by calcination in air, at temperatures ranging from 100° C. to 1000° C., preferably from 200° C. and 600° C., so as to decompose the precursors of the oxides and provide the formation of the desired mixed oxides. The metal ratio (metal 1)/(metal 1+metal 2) in the resulting double mixed metallic oxide ranges from 0.001 to 1, more preferably from 0.2 to 0.4. Said "metal 1" represents inorganic salts of transition metals of group VIII-B of the Periodic Table of Elements, and said "metal 2" represents oxides of transition metals of group VI-B of the Periodic Table of Elements.

The material then obtained is ready to be employed as a catalyst, after reduction under appropriate conditions, as will be illustrated in the examples given below.

In a typical application for the selective glycerin hydrogenation, a charge of glycerin is introduced in a hydrogen stream and onto a catalytic bed with the aid of an injecting pump. Preferably said charge of glycerin is in the form of an aqueous solution at proportions ranging from 30% to 100%. The charge of glycerin reacts with hydrogen in the presence of the catalyst, under adequate conditions of temperature, pressure, glycerin/hydrogen molar ratio and space velocity. Typical values of total pressure of the process range from 0 $kgf/cm^2$ and 150 $kgf/cm^2$, preferably from 0.01 to 10 $kgf/cm^2$; typical values of temperature range from 150° C. to 550° C., preferably from 250° C. to 350° C.; typical values of the glycerin/hydrogen molar ratio range from 1:5 to 1:1000, preferably from 1:30 to 1:240 and of the space velocity range from 0.01 $h^{-1}$ to 100 $h^{-1}$, preferably from 2.0 $h^{-1}$ to 20 $h^{-1}$. According to a preferred embodiment of the invention the hydrogenation reaction takes place in a system where the catalyst is in a fixed-bed system in the reactor.

More specifically the selective hydrogenation of glycerin to propene and propane is exemplified in scheme 2.

Scheme 2: Hydrogenation of glycerin to propene and propane on multi-metal catalysts.

multi-metal catalyst

3 H$_2$O

The examples presented hereinafter have the purpose of only illustrating the invention and facilitating the understanding thereof, without any limitation thereof.

Example 1

This example discloses a process of formulating and preparing the catalyst by the route proposed in the present invention, using the slurry impregnation techniques in the case of transition metal oxide on the support, followed by impregnation by varying the pH to the inorganic salt of the transition metal.

A suspension of molybdenum oxide on activated charcoal powder is obtained by dissolving 15 g of molybdenum in 50 mL of deionized water kept under stirring, and adding 35 g of activated charcoal powder in 100 mL of deionized water. The pH of the solution ranges from 2.5 to 3.5. The suspension is vigorously stirred (600-900 rpm). After approximately 30 minutes, it is observed that the suspension gradually becomes gray. After two hours' stirring, the suspension is subjected to a decrease in volume by evaporation of the water under reduced pressure, typically 0.05 to 0.10 kgf/cm$^2$ and heating, typically 50 to 80° C., until the formation of a humid slurry.

An iron-nitrate solution is separately prepared by dissolving 10 g of the salt in 100 mL of deionized water. This solution receives dropwise a basic solution with 30% ammonium hydroxide (NH$_4$OH) in water, allowing the precipitation of the metallic compound. This solution containing the precipitate is mixed, under vigorous stirring (600-900 rpm) with the humid slurry obtained in the previous step, under controlled conditions of temperature ranging from 21° C. to 27° C. Then, the pH of the fresh suspension is adjusted by introducing about 580 mL of basic solution with 30% ammonium hydroxide (NH$_4$OH) in water and remains between 11 and 13.

After 30 minutes' stirring, a homogeneous suspension is observed. After two hours, a decrease in volume of the suspension is carried out by evaporation of the water under reduced pressure and without heating for a period of time ranging from 10 minutes to 24 hours. Then, the temperature is raised to the range of 70°-85° C., for completely drying the material.

The catalyst obtained is calcined in muffle furnace at 400° C., according to a schedule of temperature that starts from room temperature and keeps a heating rate of 10° C./minute, until the desired temperature is reached, at which it remains for a further 120 minutes.

Example 2

A catalytic test unit equipped with a mass flow controller, a programmer and a linear temperature controller and a furnace, was coupled to a gas chromatograph with flame ionization detector (FID) and equipped with a 50 m methyl-silicone capillary column, for utilization in glycerin hydrogenation.

A mass of catalyst identified as CA-4 (5% Fe), the preparation of which was described in the preceding example, was placed in the fixed-bed catalytic reactor and subjected to a pre-treatment at 550° C. for 30 minutes with a heating rate of 10° C./minute under continuous stream of H$_2$ (40 mL/min), for the reduction of the metallic sites to take place.

The hydrogenation reaction was conducted under a continuous stream of a charge of glycerin in hydrogen (H$_2$). The glycerin was introduced in the gaseous hydrogen stream and onto the catalytic bed through an injecting pump. The products were analyzed by the gas chromatograph coupled in line to the catalytic test unit.

The conversion and selectivity parameters of the catalyst (CA-4, Fe) were evaluated with respect to the catalytic tests at 300° C., varying the space velocity of the charge for the purpose of maximizing the production of propene.

The influence of the space velocity (WHSV) on the selectivity of the products formed was determined by applying values in the range of 4.8 h$^{-1}$ to 6.4 h$^{-1}$.

Figure 1:
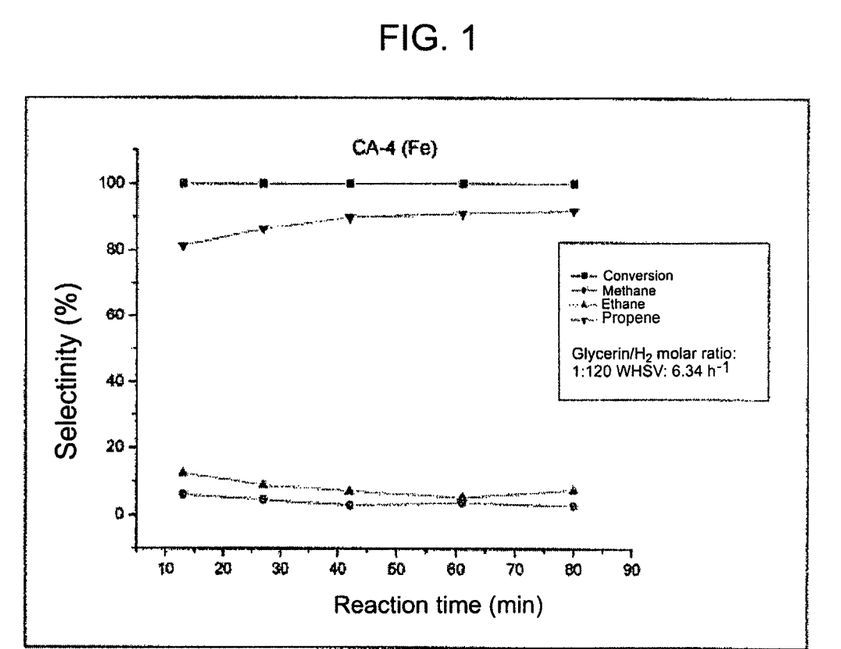
FIG. 1 shows the carbon selectivity of organic products with catalysts identified as CA-4 (Fe) with WHSV ("weight hourly space velocity") of 6.34 $h^{-1}$ and $H_2$/glycerin molar ratio of 120:1 (reaction temperature=300°.
Figure 2:
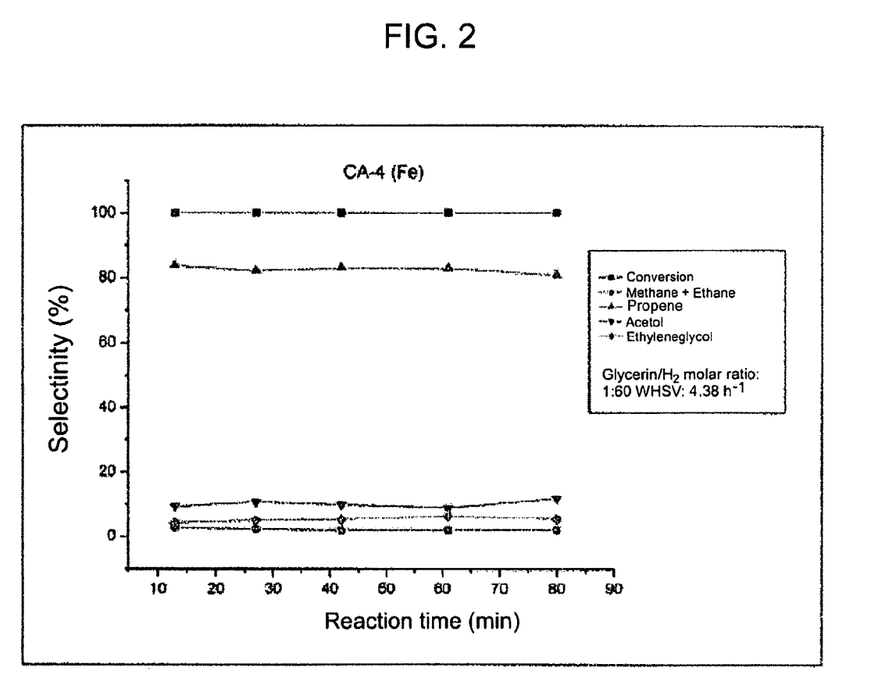
FIG. 2 shows the carbon selectivity of organic products with catalyst identified as CA-4 (Fe) with WHSV of 4.38 $h^{-1}$ and $H_2$/glycerin molar ratio of 60:1 (reaction temperature=300° C.)
Figure 3:
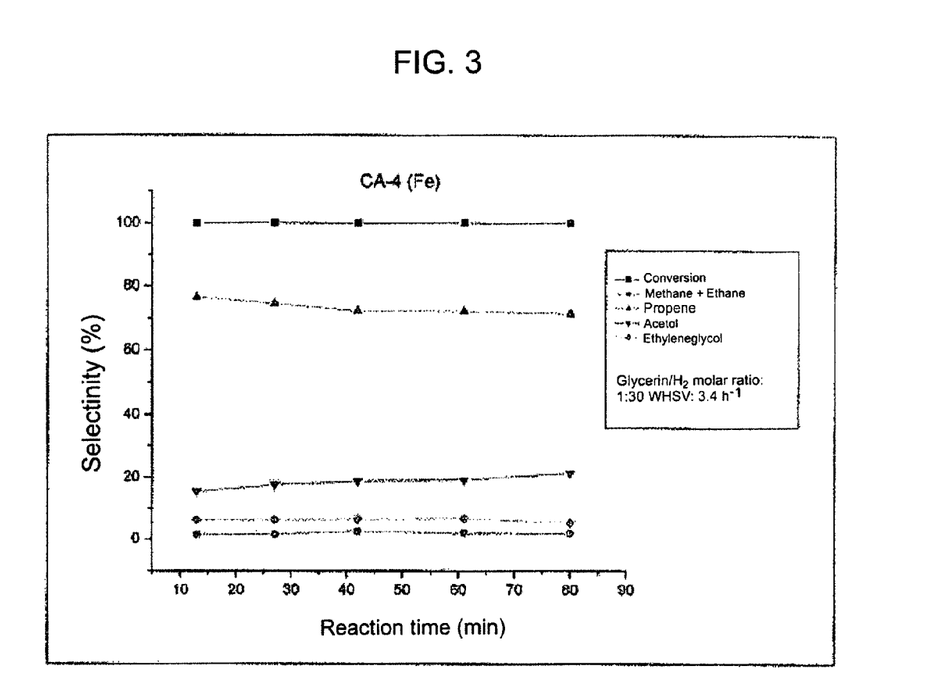
FIG. 3 shows the carbon selectivity of organic products with catalyst identified as CA-4 (Fe) with WHSV of 3.4 $h^{-1}$ and $H_2$/glycerin molar ratio of 30:1 (reaction temperature=300°.

At the best conditions of reaction used, the glycerin conversion was of 100% and the propene was formed with selectivity close to 90%. The other products detected were methane, ethane and propane (FIG. 1). The variation in the H$_2$/glycerin molar ratio may affect the selectivity and the distribution of products, as can be observed in FIGS. 2 and 3.

Figure 4:
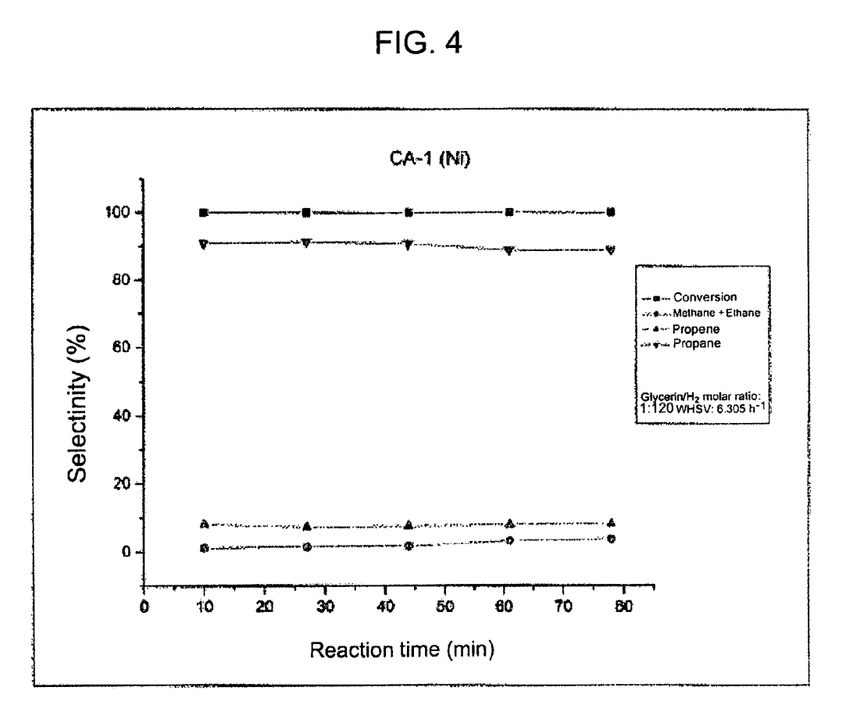
FIG. 4 shows the carbon selectivity of organic products with catalyst identified as CA-1 (Ni) with WHSV of 6.3 $h^{-1}$ and $H_2$/glycerin molar ratio of 120:1 (reaction temperature=300°.
Figure 5:
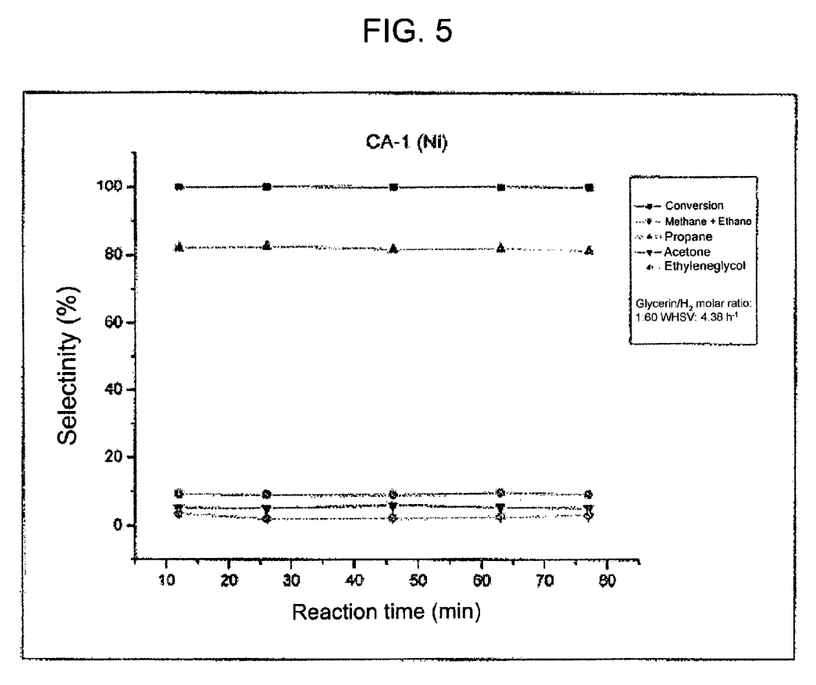
FIG. 5 shows the carbon selectivity of organic products with catalyst identified as CA-1 (Ni) with WHSV of 4.38 $h^{-1}$ and $H_2$/glycerin molar ratio of 60:1 (reaction temperature=300°.

FIGS. 4 and 5 show the results of conversion and selectivity for glycerin hydrogenation on a multi-metal catalyst CA-1 (5% Ni), wherein nickel instead of iron was impregnated onto the activated charcoal support impregnated with molybdenum oxide. In this case, propane was the main product.

The invention claimed is:

1. A process for selective hydrogenation of glycerin, characterized in that it comprises reacting a feed of glycerin and hydrogen on a multi-metal catalyst comprised by metals of group VI-B of the Periodic Table of Elements and iron (Fe), or their respective oxides, supported on a material selected from activated charcoal powder, aluminosilicates, aluminas, clays, zeolites and molecular sieves, at a temperature ranging from 150° C. to 550° C., under a pressure ranging from 0 kgf/cm$^2$ to 200 kgf/cm$^2$, glycerin/H$_2$ molar ratio ranging from 1:5 to 1:1000, and glycerin space velocity ranging from 2.0 h$^{-1}$ to 20 h$^{-1}$, for selectively converting glycerin to propene.

2. The process according to claim 1, characterized in that the temperature ranges from 250° C. to 350° C.

3. The process according to claim 1, characterized in that the pressure ranges from 0.01 kgf/cm$^2$ to 10 kgf/cm$^2$.

4. The process according to claim 1, characterized in that said feed of glycerin is in the form of an aqueous solution at proportions ranging from 30 wt % to 100 wt %.

5. The process according to claim 1, characterized in that the hydrogenation reaction takes place in a system where the catalyst is in a fixed-bed system in the reactor.

* * * * *